UNITED STATES PATENT OFFICE.

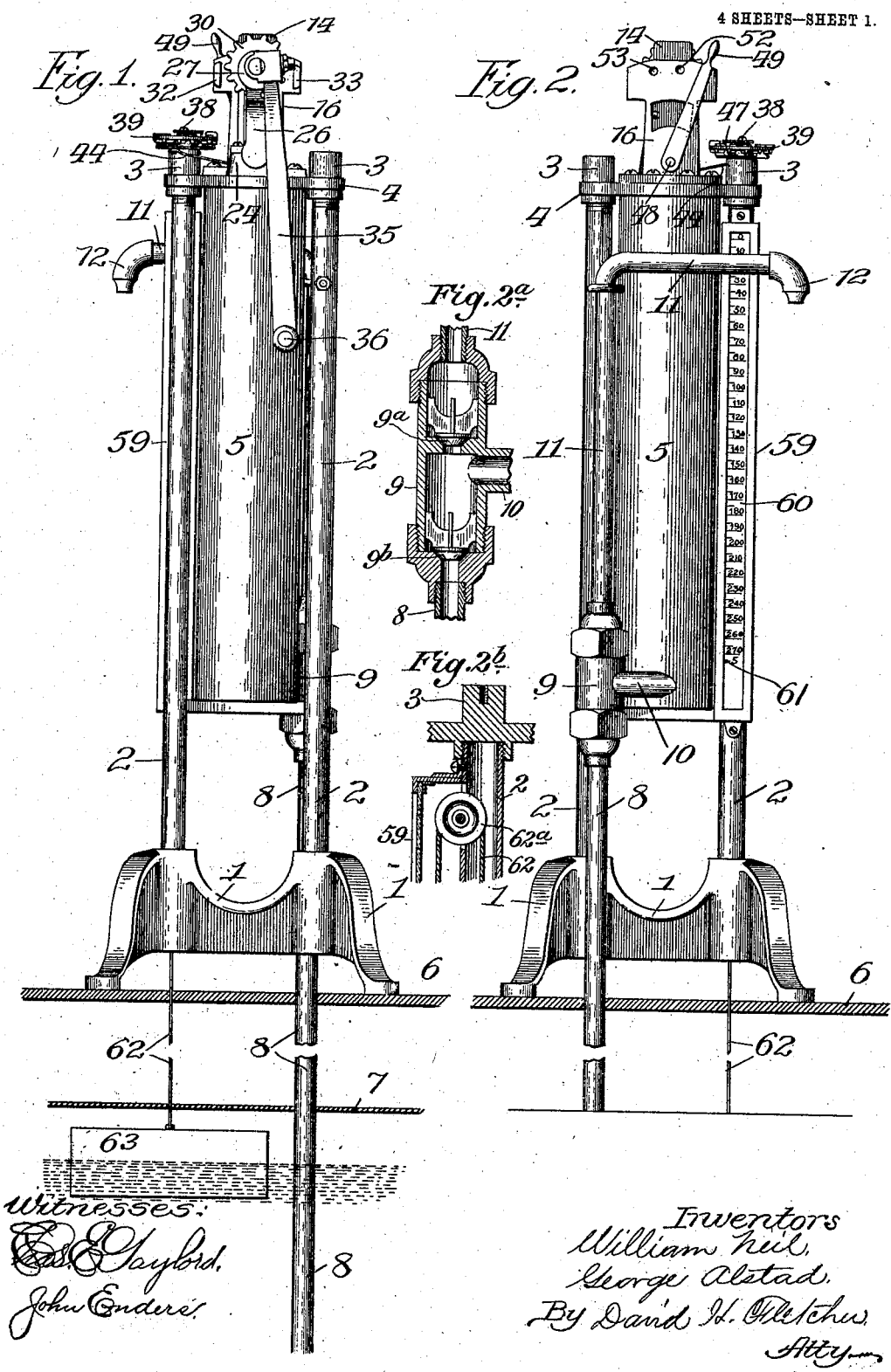

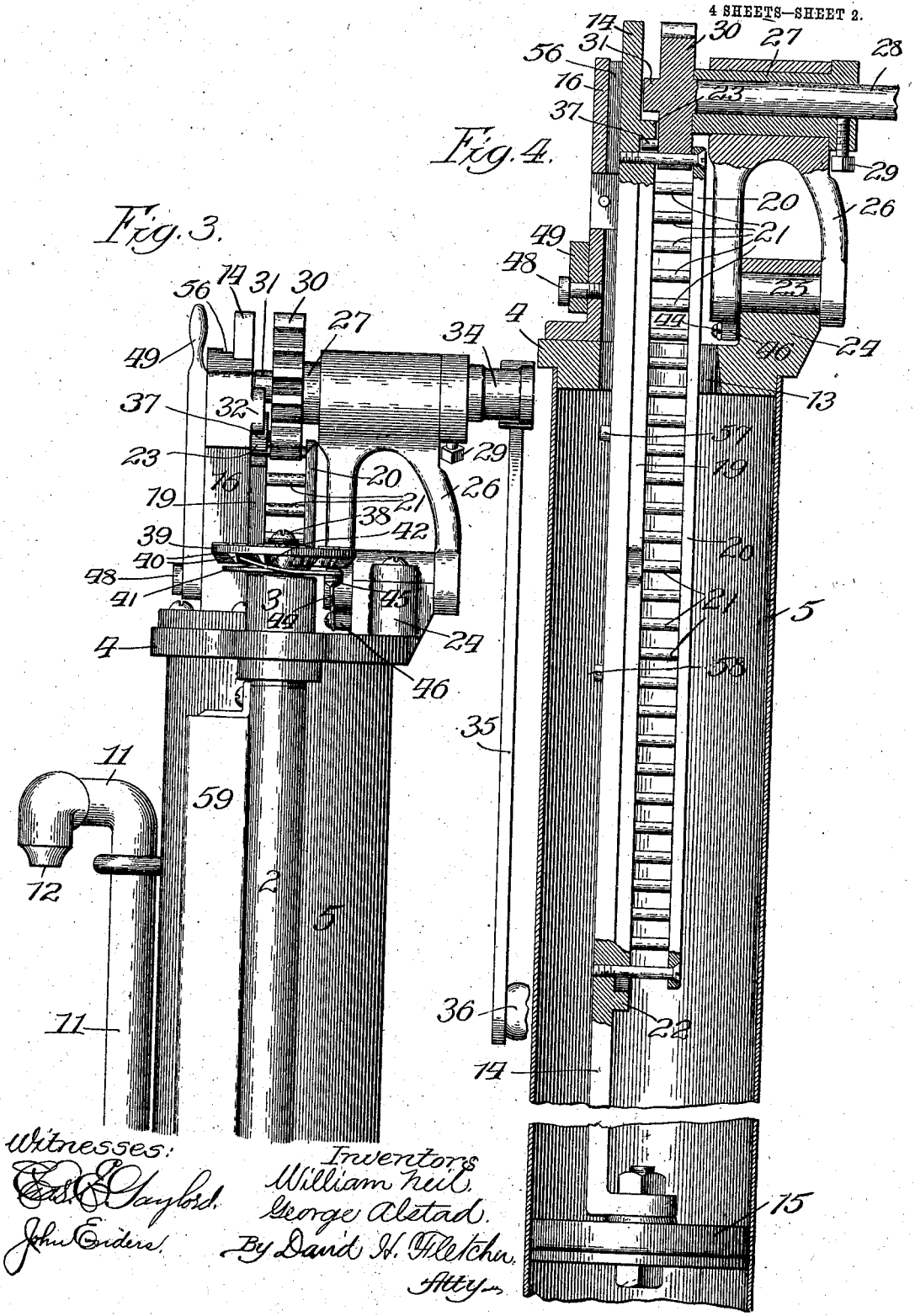

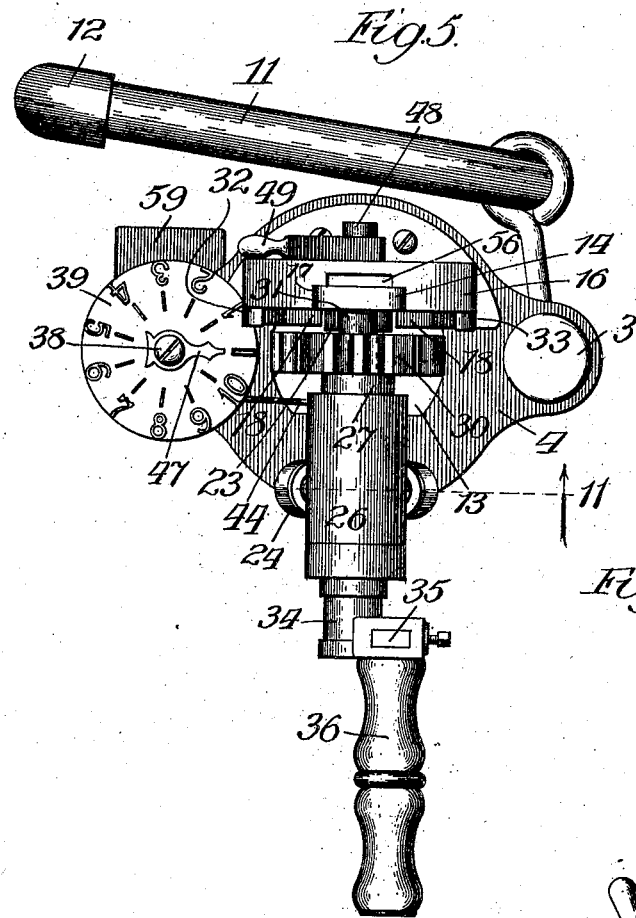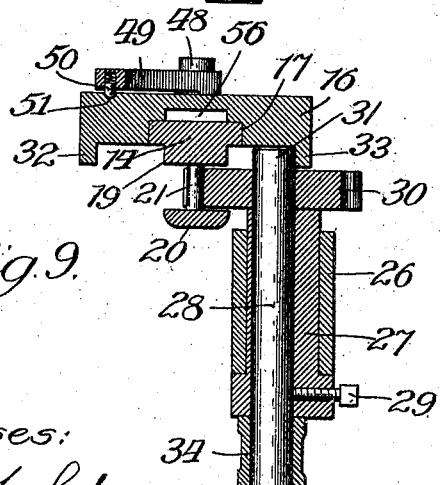

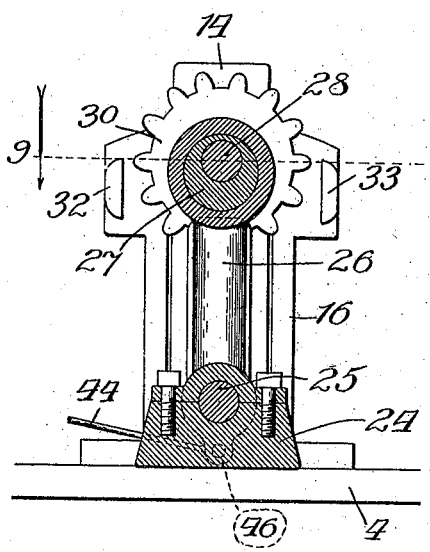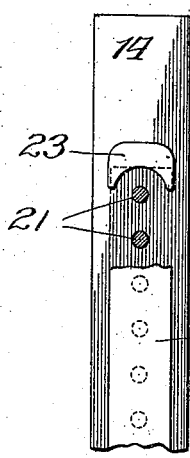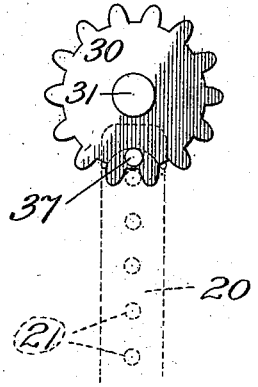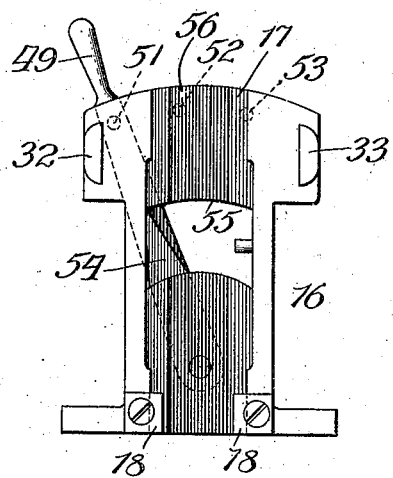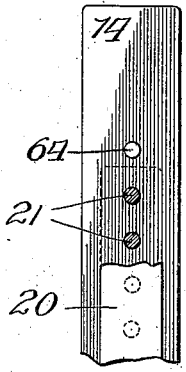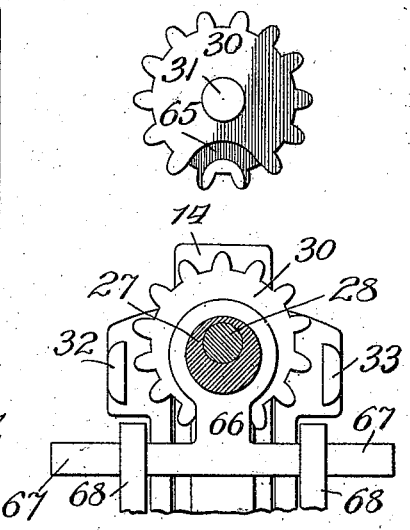

WILLIAM NEIL AND GEORGE ALSTAD, OF CHICAGO, ILLINOIS; SAID ALSTAD ASSIGNOR TO SAID NEIL.

PUMP.

No. 814,867.  Specification of Letters Patent.  Patented March 13, 1906.

Application filed May 24, 1905. Serial No. 262,051.

*To all whom it may concern:*

Be it known that we, WILLIAM NEIL and GEORGE ALSTAD, citizens of the United States, residing at Chicago, in the county of Cook and State of Illinois, have jointly invented certain new and useful Improvements in Pumps, of which the following is a description, reference being had to the accompanying drawings, forming a part of this specification, in which corresponding numerals of reference in the different figures indicate like parts.

The object of our invention, generally speaking, is to provide a simple, cheap, and powerful reciprocating pump which may be operated in a novel way by means of a crank and may be utilized for any purposes to which such pumps are applicable; and to this end a prominent feature of our invention consists in the means employed for converting rotary into reciprocating motion.

A further object is to provide novel means whereby said pump may be utilized for the pumping and accurate measurement of liquids as a result of continuously rotating the crank.

Other objects are to enable varying quantities to be measured, to automatically register the quantities measured, and to provide novel means for adjusting the throw of the piston to insure accurate measurements, all of which are hereinafter more particularly described, and definitely pointed out in the claims.

In the drawings, Figure 1 is a front elevation of our improved pump, showing the same in connection with a reservoir beneath the floor or platform upon which it is placed, the latter of which is shown in section. Fig. 2 is a rear view of said pump similarly located. Fig. 2ᵃ is a vertical sectional view of the valve-cylinder, which is connected with the pump-cylinder, showing the valve therein. Fig. 2ᵇ is a like view of the upper portion of the gage-case and supporting-tube, showing the cord-pulley therein. Fig. 3 is an enlarged side view of the upper portion of the pump, showing the pump-rod in its lowermost or initial position. Fig. 4 is a central vertical sectional view thereof in which the pump-plunger is also shown. Fig. 5 is a plan view. Fig. 6 is a bottom view of the registering-disk. Fig. 7 is a plan view of a retaining-pawl. Fig. 8 is a like view of the pawl and rod connected therewith for actuating the counting-disk. Fig. 9 is a sectional view in plan, taken upon the line 9, Fig. 11, with the exception that the eccentric is turned to the position which it would assume with the crank in a horizontal plane. Fig. 6c 10 is a perspective view of the stop for limiting the movement of the pump-rod for measuring fractions of gallons. Fig. 11 is a vertical sectional view taken upon the line 11, Fig. 5. Fig. 12 is a face view of a part of the upper portion of the pump-rod. Fig. 13 is a face view of the driving-pinion for actuating the pump-rod, a portion of which latter is indicated in dotted lines. Fig. 14 is a detailed view of the inner face of the guide for guiding the pump-rod, together with the adjustable stop for limiting its movement. Fig. 15 is a face view of the upper portion of a modified form of pump-rod. Fig. 16 is a view of a modified form of driving-pinion adapted to coact with said modified pump-rod, and Fig. 17 is a view showing a modified means for premitting a lateral movement of the pinion to enable it to shift from one side to the other of the rack.

Referring to the drawings, 1, Figs. 1 and 2, designates the lower portion or base of the frame of our improved pump, which consists of a suitable casting to which is rigidly secured hollow uprights 2 2, having rigidly attached thereto at the upper ends by means of screw-caps 3 a horizontal plate 4, which forms the cap-plate of a pump-cylinder 5. In practice the base 1 is intended to be bolted to a floor 6, beneath which is located a reservoir 7, into and to a level at or near the bottom of which is extended the supply-pipe 8 of the pump. The pipe 8 leads into the bottom of a valve-cylinder 9, Fig. 2, outside of and at the lower end of the pump-cylinder 5, with which it is connected by a conduit 10. The cylinder 9 is provided at the bottom and top, respectively, with check-valves 9ᵃ and 9ᵇ, Fig. 2ᵃ, of the usual well-known form, one of which is adapted to close when the other is opened, and with the top of said cylinder is connected a discharge-pipe 11, bent as shown and provided with a discharge-nozzle 12. The end plate 4 of the pump-cylinder is provided with an opening 13, Figs. 4 and 5, through which is extended a pump-rod 14, having the usual piston 15, Fig. 4, detachably secured to its lower end in any well-known manner.

Bolted to the top of the plate 4 is a cast-metal fitting (generally designated by 16) which is intended to serve as guide for the pump-rod, as well as for other purposes hereinafter referred to. A vertical groove 17 (better shown in Figs. 5, 9, and 14) serves as a guideway for said rod, which is held in place by means of detachable lugs 18 18, Figs. 5 and 14. Upon one side of said pump-rod, extending downwardly from near the upper end, is a rack consisting of two parallel bars 19 and 20, connected together by means of a series of pins 21 and rigidly attached to said pump-rod in any well-known way. At each end of the rack and at equal distances from the end pins projections 22 23 are formed upon the face of the pump-rod, the working faces of which are curved, as shown in Figs. 4 and 12, to form guideways or stops for the purpose hereinafter stated.

Formed upon the plate 4 is an upwardly-extended lug 24, Figs. 1, 3, 4, 5, and 11, in which is formed a horizontal journal-bearing for the reception of a journal 25, Figs. 4 and 11, upon which is pivoted an upwardly-extended oscillatory support 26, in the upper end of which is formed a horizontal bore for the reception of an eccentric member 27. Said part 27 is provided with a bore eccentric to its axis, in which is inserted a shaft 28, adapted to be rigidly and adjustably secured to said eccentric by means of a set-screw 29, which is tapped into the projecting end of said eccentric, said end being constructed to form a shoulder to fit against the part 26. Mounted upon the shaft 28 is a pinion 30, which is so adjusted as to permit the end of the shaft to project through it, as shown at 31, Figs. 3, 4, 5, 9, and 13. The teeth of said pinion are adapted to engage the rack upon the pump-rod; but inasmuch as said pinion is mounted upon the oscillatory support 26 and inasmuch as the pinion is intended in turn to operate upon opposite sides of the rack suitable means are required to maintain it in proper relative positions. This is accomplished primarily by means of two bearing-lugs 32 33, Figs. 1, 3, 5, 9, 11, and 14, upon the inner face of the part 16, the distance of said lugs from the rack being such that when the pinion is upon either side of the rack with the teeth in engagement with the latter the end 31 of the shaft will bear against one of said lugs, as shown in Fig. 9, and hold the rack and gear in engagement. A sleeve 34 is rigidly attached to the opposite end of the shaft from that upon which the pinion is placed, with which in turn is connected a crank-arm 35, having a handle 36. Upon the face of the pinion next to the pump-rod and in a radial line drawn midway between two of the pinion-teeth near to the periphery of said pinion is located a pin 37, Figs. 3, 4, and 13, which pin projects from the face of the pinion in such a manner as to engage with the inner faces of the lugs 22 and 23 as the pump-rod is reciprocated, the curve upon the inner faces of said lugs being such as to conform to the movement of the pin, which latter acts as a stop to hold the pump-rod from movement and in proper relation to the pinion during the shift of the latter from one side to the other of the rack, as hereinafter stated. The normal position of said pin when the pump is ready to operate is that shown in Fig. 13.

The operation of the mechanism so far as described is as follows: Assuming the pump-rod to be in its lowermost position, as shown in Fig. 1, with the crank extending downwardly and the pump-plunger 15 at the bottom of the cylinder, the support 26 would then be vertical and the pinion 30 would stand directly above the rack with the uppermost pin of said rack between two of the teeth of said pinion. (See Figs. 3, 4, 5, 11, and 13.) The pin 37 upon the pinion would then project beneath the part 23 in alinement with the pins 21, as indicated in Figs. 4 and 13, and prevent the pump-rod from descending. Upon making a quarter of a turn of the handle from right to left the oscillatory support 26 will have been tilted to the right and the pinion will have assumed the position shown in Fig. 9, with its teeth in positive operative engagement with the uppermost pin of the rack and the end 31 of the shaft against the inner face of the bearing-lug 33. By continuing the rotation of the crank, the pinion being held into engagement with the rack by the bearing-lug 33, the pump-rod is caused to be lifted until the lower end of the rack is reached, when the pinion is caused to roll beneath the lowermost pin of the rack, the stop-pin 37 in the meantime passing into engagement with the curved projection 22 beneath the rack, in which engagement it remains until the movement of the pinion beneath is completed and the pinion is shifted to the opposite side of and into like positive engagement with the rack, when the end 31 of the shaft will be caused to bear against the bearing-lug 32. It will thus be seen that as a result of a continuous rotation of the shaft in a given direction the pinion will continue to rotate in engagement with the rack until the end is reached, when it will shift automatically to the opposite side of the rack, thereby reversing the direction of movement of said rack, thus producing a reciprocating motion of the pump-plunger as long as the crank is rotated. The upward stroke of the plunger serves to open the lower valve in the part 9 and to close the upper one, thereby drawing the liquid into the cylinder 5, while the downward stroke serves to close said lower valve while opening the upper one and to force the liquid out through the discharge-pipe 11.

Such a pump, while capable of being used for any purpose to which a plunger-pump may be adapted, would not constitute an accurate measuring-pump unless the rack mechanism were constructed with great accuracy and care to gage the proper length of stroke, and even then any material wear upon the parts would render it inaccurate and necessitate a replacement of the entire rack-and-pinion mechanism. Such a construction, therefore, owing to cost of original manufacture and of repairs, is objectionable, and hence we have provided a simple, cheap, and novel means for quick and accurate adjustment regardless of wear or nicety of original construction and which would not interfere with the use of the device for ordinary pumping purposes regardless of measurement. As a result of the employment of the laterally-shifting support 26, by which the shaft is free to move laterally while supported at a given height, we are enabled to utilize the eccentric 27. As this is caused to rotate with the shaft, it is obvious that if set at its extreme eccentricity when in the plane of the rack or when the part 26 is vertical, as shown in Fig. 11, it would cause the maximum stroke of the rack, provided the latter were of such a length as to cause the same relative position of the pinion at the opposite end thereof, or at the point where the shift is made. This being true, it is obvious that any variation of the eccentric in its relation to the shaft would vary the length of the plunger-stroke in like proportion, thereby enabling any degree of variation between the two extremes of the eccentric to be made, thus enabling the measurement to be adjusted at any time with the utmost accuracy.

The pump may be of a capacity to measure any desired quantity with each double stroke. In the example shown we have assumed the unit of measurement to be a gallon, and in this connection we have provided an accurate registering device, which will now be described. Mounted upon one of the caps 3, by means of a screw 38, upon which it is loosely pivoted, is a disk 39, (better shown in Figs. 3, 5, and 6,) which disk is provided with ratchet-teeth 40 upon its lower face, adapted to be engaged and prevented from backward rotation by means of a spring retaining-pawl 41, Figs. 3 and 7, which is rigidly attached to the cap 3, and to be actuated by means of a pawl 42, Figs. 3 and 8, which is pivoted at 43 to the screw 38. A rod 44 has one end jointedly connected at 45 to said pawl, while the other end is jointedly connected to the end of a short arm 46, (shown in Figs. 3 and 4 and indicated in dotted lines in Fig. 11,) which is extended downwardly from the part 26 and is integral therewith. With each shift of the pinion upon completing the downward stroke of the pump-rod the arm 46 causes the movement of the actuating-pawl, while the shift at the lower end of the rack reverses it, thereby moving the disk 39 one notch and bringing a new number (see Fig. 5) opposite an indicator 47.

The following-described mechanism is provided for measuring less than a gallon: Pivoted at 48 upon the part 16 is a controlling-arm 49, (better shown in Figs. 3, 5, 9, and 10,) which arm is provided with a spring-controlled detent 50, Fig. 9, adapted to enter indentations 51 52 53, Figs. 2, 9, and 14, by which said arm may be yieldingly retained in either of the positions indicated. A shoulder 54, Figs. 10 and 14, is extended through an opening 55 in the part 16, so as to project into a vertical groove 56, Figs. 3, 4, 5, 9, and 14, formed in the part 16 to permit the passage of pins 57 58, Fig. 4, which are caused to project from the face of the pump-rod. Said pins are so placed that when the arm 49 is moved to the indentation 52 the shoulder 54 will be brought into engagement with the stop-pin 57, and when moved to the indentation 53 it will engage the pin 58. The first of said pins may be so placed as to cause the measurement of a quarter and the other of half a gallon. In using said stops, however, it is obvious that the crank should be reversed with each separate measurement in order to cause a discharge of the amount measured.

For the purpose of determining the quantity of liquid in the reservoir we provide a gage which consists of a metal case 59, Figs. 1, 2, 3, and 5, rigidly attached to one of the hollow uprights 2. Within said case is inclosed a graduated scale 60, exposed through the usual glass-covered opening. A weighted movable indicator 61, Fig. 2, is located within said case behind the glass and connected, by means of a cord 62, to a float 63, Fig. 1, located within the reservoir 7. The cord is trained over a pulley 62$^a$, Fig. 2$^b$, at the top of the gage-case and carried downwardly through the hollow standard 2 to the float. As the liquid is drawn from the reservoir the float descends, thereby lifting the indicator to the figure upon the scale which represents the number of gallons remaining in the tank. This construction being wholly protected against outside interference is a guaranty against unauthorized manipulation.

In Figs. 15 and 16 there is shown a modification. Instead of the curved projections 22 and 23 at the ends of the rack upon the pump-rod and the pin 37 upon the pinion we have substituted short pins in lieu of said projections, one of which, 64, is shown in Fig. 15, and have made a curved groove 65, Fig. 16, in the outer face of the pinion, which is adapted to receive said pins respectively when the pinion is shifted.

In lieu of the pivoted oscillatory support 26 for permitting the pinion-shaft to shift laterally it is obvious that a sliding support may be employed. Such a construction is shown in Fig. 17, in which the eccentric 27 is journaled in a support 66, having laterally-extended arms 67, which are adapted to slide in bearings formed in lugs 68, which may be secured to the top plate 4 of the pump-cylinder.

Having thus described our invention, we claim—

1. A plunger-pump of the class described, in which is combined a rack, a pinion mounted in a movable eccentric-bearing for engaging said rack, means for shifting said pinion from one side to the other at the respective ends of the rack to reciprocate the pump-plunger by a continuous rotation of said pinion, and means for adjusting the position of said eccentric upon the shaft, to vary the length of the plunger-stroke.

2. A pump of the class described, in which is combined a rack, a pinion mounted in a movable bearing for engaging said rack, means for shifting said pinion from one side to the other at the respective ends of the rack, and an adjustable revoluble eccentric-bearing mounted upon the shaft of said pinion for varying the distance between the axis of the eccentric and the pins of the rack when said shift occurs.

3. A pump of the class described, in which is combined a rack, a pinion mounted in a movable bearing for engaging said rack, means for shifting said pinion from one to the other side of said rack, and means for locking said rack against endwise movement during the time the pinion is being shifted from a positive engagement with the rack upon one side, to a like engagement therewith upon the other.

4. A pump of the class described, in which is combined a rack, a pinion mounted upon a shaft supported in a movable eccentric-bearing for engaging said rack, means for shifting said pinion from one to the other side of said rack, and means upon opposite sides of said rack for engaging said shaft to hold the teeth of the pinion in constant engagement with the rack while the pinion is rotated.

5. A pump of the class described, in which is combined a rack, a pinion mounted in a movable bearing for engaging said rack, means upon opposite sides of said rack for holding the teeth of the pinion into constant engagement with the rack throughout its length, means for shifting said pinion at each end of said rack from one to the other side thereof, and means for locking said rack against endwise movement during the time the pinion is being shifted from a position of positive engagement with the rack upon one side to a position of like engagement therewith upon the other.

6. The combination with a measuring-pump of a rack and pinion for actuating the plunger, and an eccentric-bearing adjustably mounted upon the pinion-shaft for controlling the relation between the axis of the eccentric and the pins of the rack at each end of the latter.

7. The combination with a measuring-pump, of a rack and pinion for reciprocating the plunger, said pinion being mounted in a bearing adapted to be moved transversely of the plane of the rack to permit the shifting of the pinion from one side to the other of said rack, and a revoluble eccentric for varying the relation between the axis of the eccentric and the respective end pins of the rack.

8. The combination with a measuring-pump, of a rack and pinion for reciprocating the plunger, said pinion being mounted in a bearing adapted to be moved transversely of the plane of the rack to permit the shifting of the pinion from one side to the other of said rack, said pinion-shaft being adjustably mounted in the eccentric within said transversely-movable bearing, and means for rotating said eccentric with said shaft.

9. The combination with a pump of the class described, of a rack and pinion for reciprocating the plunger, the shaft of said pinion being adjustably mounted in an eccentric-bearing, which eccentric is, in turn, mounted in an oscillatory support free to shift from one to the other side of the plane of the rack when the pinion is brought into engagement with either end thereof, means for rigidly connecting said eccentric to said shaft, and stationary guides upon opposite sides of the rack for alternately engaging a portion of the pinion-shaft to hold the pinion into engagement with the rack.

In testimony whereof we have signed this specification, in the presence of two subscribing witnesses, this 22d day of May, 1905.

WILLIAM NEIL.
GEORGE ALSTAD.

Witnesses:
D. H. FLETCHER,
CARRIE E. JORDAN.